US008621834B2

(12) United States Patent
Giotto et al.

(10) Patent No.: US 8,621,834 B2
(45) Date of Patent: Jan. 7, 2014

(54) DRIVE ARRANGEMENT FOR A REEL AND A CHAFF SPREADER OF A COMBINE

(75) Inventors: Angelo Giotto, Horizontina (BR); Paulo C. Rodrigues, Horizontina (BR); Aldo Bisson, Cotia (BR)

(73) Assignee: John Deere Brasil Ltd. Av. Eng. Jorge A. D. Logemann 600, Rio Grande do Sul (BR)

( * ) Notice: Subject to any disclaimer, the term of this patent is extended or adjusted under 35 U.S.C. 154(b) by 476 days.

(21) Appl. No.: 12/940,549

(22) Filed: Nov. 5, 2010

(65) Prior Publication Data
US 2011/0107734 A1    May 12, 2011

(30) Foreign Application Priority Data

Nov. 7, 2009 (DE) ..................... 20 2009 015 201 U

(51) Int. Cl.
*A01D 34/00* (2006.01)
(52) U.S. Cl.
USPC ......................................................... 56/14.6
(58) Field of Classification Search
USPC ............. 56/11.1, 11.7, 11.9, 12.5, 13.5, 14.6, 56/10.9; 460/6
See application file for complete search history.

(56) References Cited

U.S. PATENT DOCUMENTS

| 3,498,036 | A | * | 3/1970 | Cowling et al. | 56/11.9 |
| 3,534,532 | A | * | 10/1970 | Windhausen | 56/10.7 |
| 3,546,860 | A | * | 12/1970 | Pool et al. | 460/6 |
| 3,589,109 | A | * | 6/1971 | Payne | 56/10.2 R |
| 3,748,840 | A | * | 7/1973 | Kanengieter et al. | 56/341 |
| 3,885,375 | A | * | 5/1975 | Solterbeck | 56/15.6 |
| 4,147,017 | A | * | 4/1979 | Cortopassi et al. | 56/16.5 |
| 5,797,793 | A |   | 8/1998 | Matousek et al. | |
| 6,116,006 | A | * | 9/2000 | Killen et al. | 56/11.9 |
| 6,494,025 | B1 | * | 12/2002 | Killen et al. | 56/11.1 |
| 6,976,913 | B2 | * | 12/2005 | Duquesne et al. | 460/111 |
| 7,788,889 | B2 | * | 9/2010 | Sheidler | 56/10.7 |
| 8,029,347 | B2 | * | 10/2011 | Pohlmann et al. | 460/112 |
| 2002/0040570 | A1 | * | 4/2002 | Walker et al. | 56/11.9 |

FOREIGN PATENT DOCUMENTS

| DE | 3544157 C1 | 7/1987 |
| DE | 10206541 A1 | 8/2003 |
| EP | 1055359 A1 | 11/2000 |

OTHER PUBLICATIONS

European Search Report dated Feb. 23, 2011, (5 pages).

\* cited by examiner

*Primary Examiner* — Thomas B Will
*Assistant Examiner* — Joan D Misa

(57) ABSTRACT

A drive arrangement for a reel and a chaff spreader of a combine, having a first hydraulic motor for driving the reel and a second hydraulic motor for driving the chaff spreader, wherein the hydraulic motors are connected in series with regard to the flow of hydraulic fluid.

3 Claims, 2 Drawing Sheets

DRIVE ARRANGEMENT FOR A REEL AND A CHAFF SPREADER OF A COMBINE

FIELD OF THE INVENTION

The invention relates to a drive arrangement for a reel and a chaff spreader of a combine, having a first hydraulic motor for driving the reel and a second hydraulic motor for driving the chaff spreader.

BACKGROUND OF THE INVENTION

In order to pick up harvested crops, combines are fitted with cutting units which are equipped with cutter bars for cutting the crop, a reel which is arranged above the latter and rotates during operation, and a transverse conveying device in the form, for example, of a worm or a plurality of conveying belts. During operation, the reel presses the crop rearwards and downwards opposite to the forward direction in order to make it easier to cut the plants with the cutter bar. Besides mechanical drives, hydraulic drives for the reel are also known.

Furthermore, many combines are equipped with pairs of chaff spreaders, which are arranged downstream of the cleaning device with regard to the flow direction of the harvested crop residues and are used to spread the harvested crop residues remaining at the end of the upper sieve, which are substantially chaff and relatively large pieces of straw. These chaff spreaders, too, are usually hydraulically driven. See for example DE 35 44 157 C1.

Usually, the hydraulic reel drive motor is assigned a dedicated pump for driving it. See for example DE 100 12 056 A1. It was also proposed to connect the reel drive motor in series with a hydraulic motor which drives a rotating stem divider. See for example DE 102 06 541 A1. It was also proposed to connect the reel drive motor in series with hydraulic motors for driving conveying belts of the cutting unit. See for example EP 1 055 359 A1. Similarly, the hydraulic motors are assigned a dedicated hydraulic pump for driving the chaff spreader.

SUMMARY OF THE INVENTION

It is the object of the invention to create a drive arrangement, which is simplified compared with the prior art, for a reel and a chaff spreader of a combine.

This object is achieved according to the invention by the teaching of Claim 1, wherein the further claims contain features which develop the solution in an advantageous manner.

A drive arrangement for a reel and a chaff spreader of a combine comprises a first hydraulic motor for driving the reel and second hydraulic motor, connected in series therewith regard to the flow of hydraulic fluid, for driving the chaff spreader.

In this way, a single pump is sufficient to drive both hydraulic motors at the same time. Which of the hydraulic motors lies upstream and which downstream is arbitrary in the context of the concept of the invention.

In a preferred embodiment, two chaff spreaders are present, to which is assigned in each case one second hydraulic motor. The second hydraulic motors are expediently connected in series, although a parallel connection would also be possible.

Preferably, the hydraulic motors have a fixed displacement volume and are driven by a pump having a fixed delivery volume. In order to adjust the rotational speed, in each case one proportional valve is arranged in the supply lines to the hydraulic motors. In another embodiment, however, one or both hydraulic motors and/or the pump may have an adjustable displacement volume. The rotational speeds are then preferably regulated by a controller which is able to adjust all the swash plates.

In order, in the case of hydraulic motors which cannot be adjusted and a pump having a fixed delivery volume, to enable the rotational speeds to be adjusted independently by the proportional valves, without in each case changing the rotational speed of the other hydraulic motor, it is proposed to bridge the upstream connections of the proportional valves and the downstream connections of the hydraulic motors in each case by control valves. The control valves maintain a defined pressure and/or flow in the connecting line between the first and second hydraulic motors and can be actuated by the pressure at the downstream connection of the associated proportional valves.

BRIEF DESCRIPTION OF THE DRAWINGS

An exemplary embodiment of the invention is described in more detail hereinbelow and illustrated in the drawings, in which.

DESCRIPTION OF THE PREFERRED EMBODIMENT

Figure 1:
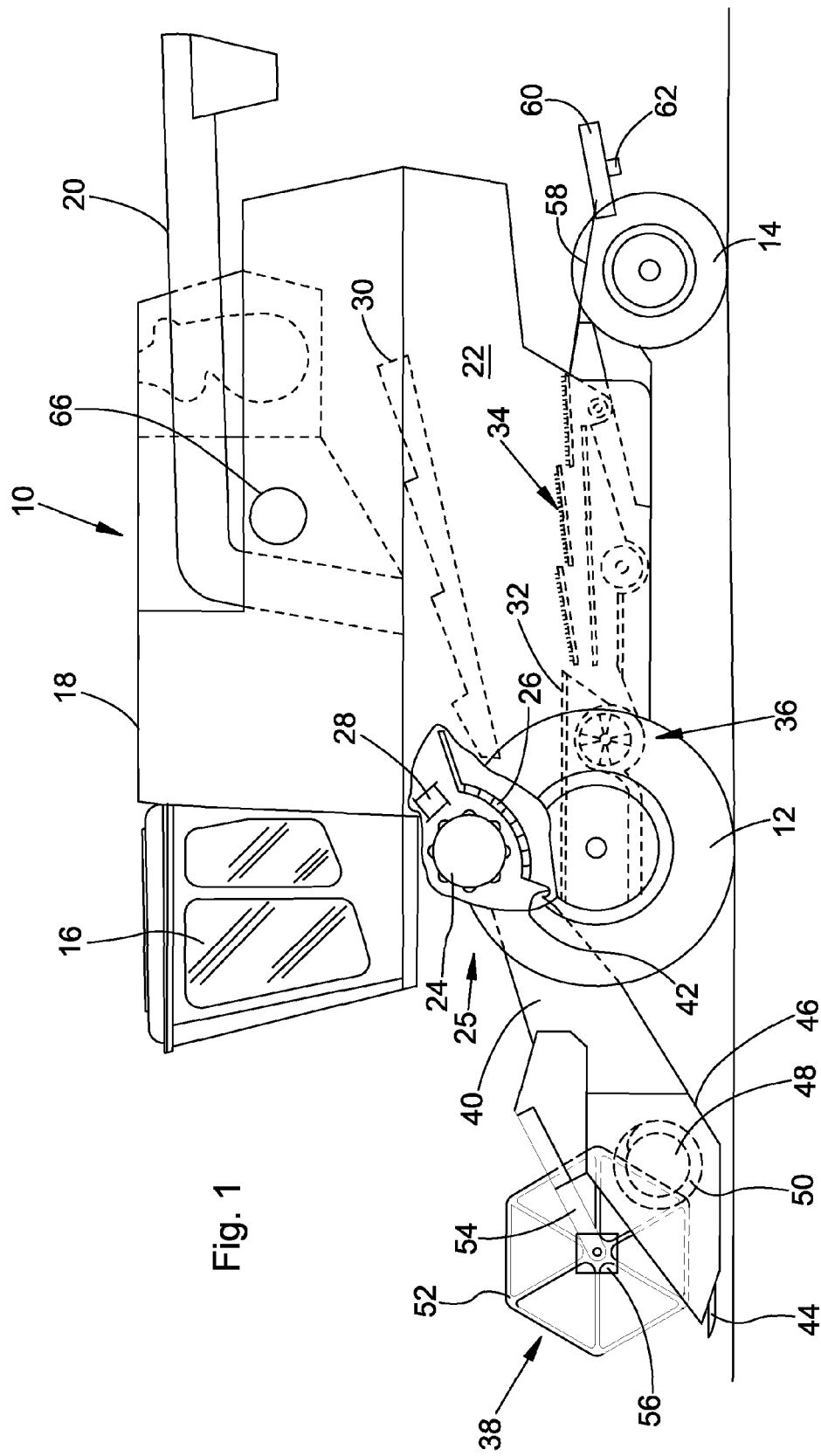
FIG. 1 shows a schematic side view of a combine having a header with a reel and also a chaff spreader.

A combine 10 shown in FIG. 1 is supported on front driven and rear steerable wheels 12 and 14, respectively, and has a driver's cabin 16 from which it can be operated by a driver. The driver's cabin 16 is adjoined to the rear by a grain tank 18 which can discharge material which has been discharged into it to the outside through an emptying pipe 20. The grain tank 18 is mounted on a frame 22, in which supplied material is broken down into its large and small constituents on the route via a threshing drum 24, a threshing cage 26 and a turning drum 28. A further separation of the harvested material is carried out on subsequent straw walkers 30, and also on a preparation floor 32 and sieves 34, wherein the threshed portion of material is then conveyed into the grain tank 18, the large pieces of harvested material are deposited on the ground via the straw walkers 30 and light constituents are supplied from the sieves 34, via a conveying floor 58 or by the air flow of the fan 36, to two chaff spreaders 60 which are arranged laterally adjacent to one another and distribute said light constituents likewise on the ground. The chaff spreaders 60 are driven by hydraulic motors 62, 62' (motor 62' best shown in FIG. 2). Material lying or standing on the ground is supplied, via a draw-in channel 40 in the form of an inclined conveyor and a stone trap 42, to the threshing drum 24 once it has been picked up from the ground by a header 38.

The header 38 in the embodiment illustrated is a cutting unit, on the front side of which a cutter bar 44 moving to and fro is located. A frame 46 of the crop harvesting device 38 further supports a screw conveyor 48 having turns 50 encircling a central pipe. Above and in front of the screw conveyor 48 is located a reel 52 which serves to feed standing material to the cutter bar 44 and the screw conveyor 48. The reel 52 is connected at its two ends to the frame 46 via reel carrier arms 54 and is driven about its longitudinal axis by a hydraulic motor 56, so that it rotates in the anticlockwise direction in FIG. 1.

Figure 2:
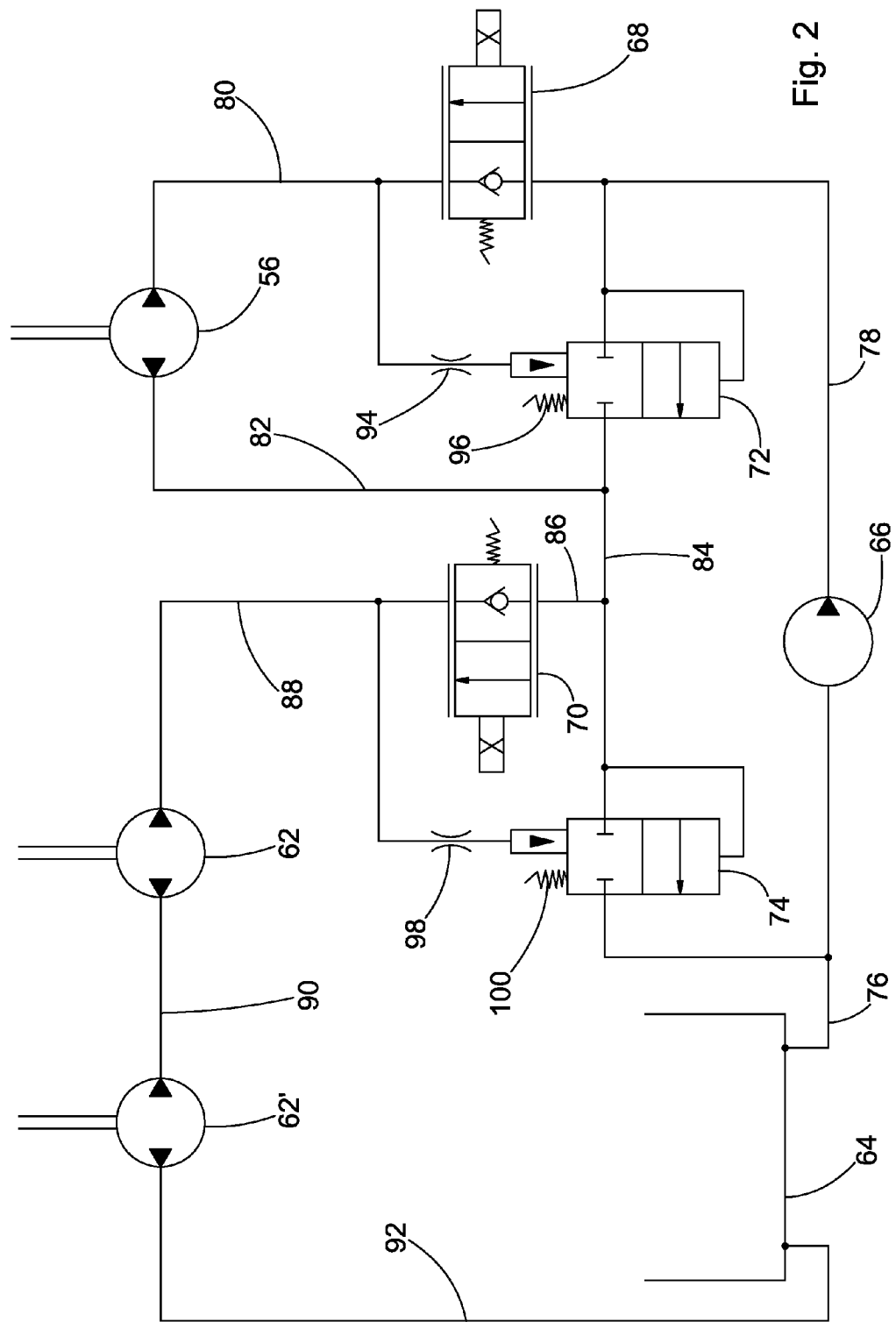
FIG. 2 shows a hydraulic diagram of the drive arrangement of the reel and the chaff spreader.

FIG. 2 shows a hydraulic diagram of the drive arrangement of the reel 52 and the chaff spreader 60. The drive arrangement, in addition to the hydraulic motor 56 for driving the reel 52 and two series-connected hydraulic motors 62, 62', the displacement volume of which cannot be adjusted and which each drive one of the chaff spreaders 60, comprises a hydraulic fluid reservoir 64 for hydraulic fluid, a pump 66 having a fixed delivery volume, two proportional valves 68, 70, two control valves 72, 74 and associated hydraulic fluid lines 76, 78, 80, 82, 84, 86, 88, 90 and 92.

The input side of the pump 66 is connected by a line 76 to the hydraulic fluid reservoir 64 and the output side is connected by a line 78 to the input of a first proportional valve 68. The output side of the first proportional valve 68 is connected by a line 80 to the inlet of the hydraulic motor 56 for driving the reel 52. Said valve can be controlled electromagnetically by an operator in the driver's cabin 16 or by a suitable control means, in order to be able to adapt the speed of the reel 52 manually or automatically to the respective harvesting conditions and the advancing speed of the combine 10.

The outlet of the hydraulic motor 56 is connected to the input of a second proportional valve 70 by lines 82, 84, 86. The output side of the second proportional valve 70 is connected by a line 88 to the inlet of a first hydraulic motor 62 for driving a chaff spreader 60, the outlet of which is connected by a line 90 to the inlet of second hydraulic motor 62' for driving a second chaff spreader 60. The outlet of the second hydraulic motor 62' is connected by a line 92 to the hydraulic fluid reservoir 64. The second proportional valve 70 can be controlled electromagnetically by an operator in the driver's cabin 16 or by a suitable control means, in order to be able to adapt the speed of the chaff spreader 60 manually or automatically to the respective harvesting conditions and the cutting unit width of the header 38.

The hydraulic motors 56 and 62, 62' are thus connected hydraulically in series. They are driven by a single pump 66, thereby reducing the outlay for the drive arrangement compared with separate drive systems for the hydraulic motors 56 on the one hand and 60, 62' on the other hand. It would also be possible to connect the pump 66 to the inlet of the hydraulic motor 62 and to connect the outlet of the latter to the hydraulic motor 56.

In order to prevent the speed of the hydraulic motors 62, 62' changing when the proportional valve 68 is adjusted, and similarly to prevent the speed of the hydraulic motor 56 changing when the proportional valve 70 is adjusted, the control valves 72, 74 are provided.

The control valve 72 is arranged between the lines 78 and 84 and is controlled, on the one hand, by the pressure in the line 78 and, on the other hand, by the pressure in the line 80, through which its control connection shown at the top is connected via a throttle 94, here shown as a hydraulic fluid flow restrictor. When, with the proportional valve 68 open, the hydraulic flow through the line 80 and thus through the hydraulic motor 56 is large, approximately the same pressure is present at the control connection shown at the top as is present at the control connection shown at the bottom, and so the spring 96 moves the control valve into the closed position. On the other hand, if the proportional valve 68 is closed, the pressure on the line 78 opens the control valve 72, and so, in this case, too, sufficient pressure and flow is available in the line 84 to drive the hydraulic motors 62, 62'.

The control valve 74 is arranged between the lines 84 and 76 (instead of being connected to the line 76, it could also be connected by a separate line to the hydraulic fluid reservoir 64) and is controlled, on the one hand, by the pressure in the line 84 and, on the other hand, by the pressure in the line 88, through which its control connection shown at the top is connected via a throttle 98, shown here+ as a hydraulic fluid flow restrictor. When, with the proportional valve 70 open, the hydraulic flow through the line 88 and thus through the hydraulic motors 62, 62' is large, approximately the same pressure is present at the control connection shown at the top as is present at the control connection shown at the bottom, and so the spring 100 moves the control valve into the closed position. On the other hand, if the proportional valve 70 is closed, the pressure on the line 84 opens the control valve 74, and so, in this case, too, sufficient flow is possible in the line 84 to divert the hydraulic fluid of the hydraulic motor 56 into the hydraulic fluid reservoir 64.

It should also be noted that pressure limiting valves (not shown) can be added between the lines 78 and 76, between the lines 80 and 82 and between the lines 88 and 92. Furthermore, the pressure of the pump 66, in addition to driving a reversing motor (not shown), can be used for the inclined conveyor 40.

Having described the preferred embodiment, it will become apparent that various modifications can be made without departing from the scope of the invention as defined in the accompanying claims.

What is claimed is:

1. A drive arrangement for a reel (52) and a chaff spreader (60) of a combine (10), having a first hydraulic motor (56) for driving the reel (52) and a second hydraulic motor (62, 62') for driving the chaff spreader (60), wherein the hydraulic motors (56, 62, 62') are connected in series with regard to the flow of hydraulic fluid, wherein each of the hydraulic motors (56, 62, 62') has a corresponding supply line for supplying hydraulic fluid to said each of the hydraulic motors (56, 62, 62'), wherein the hydraulic motors (56, 62, 62') have a fixed displacement volume and are driven by a pump (66) having a fixed delivery volume, and wherein a proportional valve (68, 70) is arranged in the corresponding supply line (80, 88) of each of the hydraulic motors (56, 62, 62') in order to vary the speed of the hydraulic motors (56, 62, 62'), and further wherein upstream connections of the proportional valves (68, 70) and downstream connections of the hydraulic motors (56, 62, 62') are in each case bridged by control valves (72, 74) which maintain a defined pressure or defined flow or both a defined pressure and a defined flow in a connecting line (84) between the first hydraulic motor (56) and second hydraulic motor (62, 62').

2. The drive arrangement according to claim 1, wherein the control valves (72, 74) are actuated by the pressure at the downstream connections of the associated proportional valves (68, 70).

3. A combine (10) having a header (38) comprising a reel (52), at least one chaff spreader (60), and a driven arrangement according to claim 1.

* * * * *